United States Patent Office 3,549,237
Patented Dec. 22, 1970

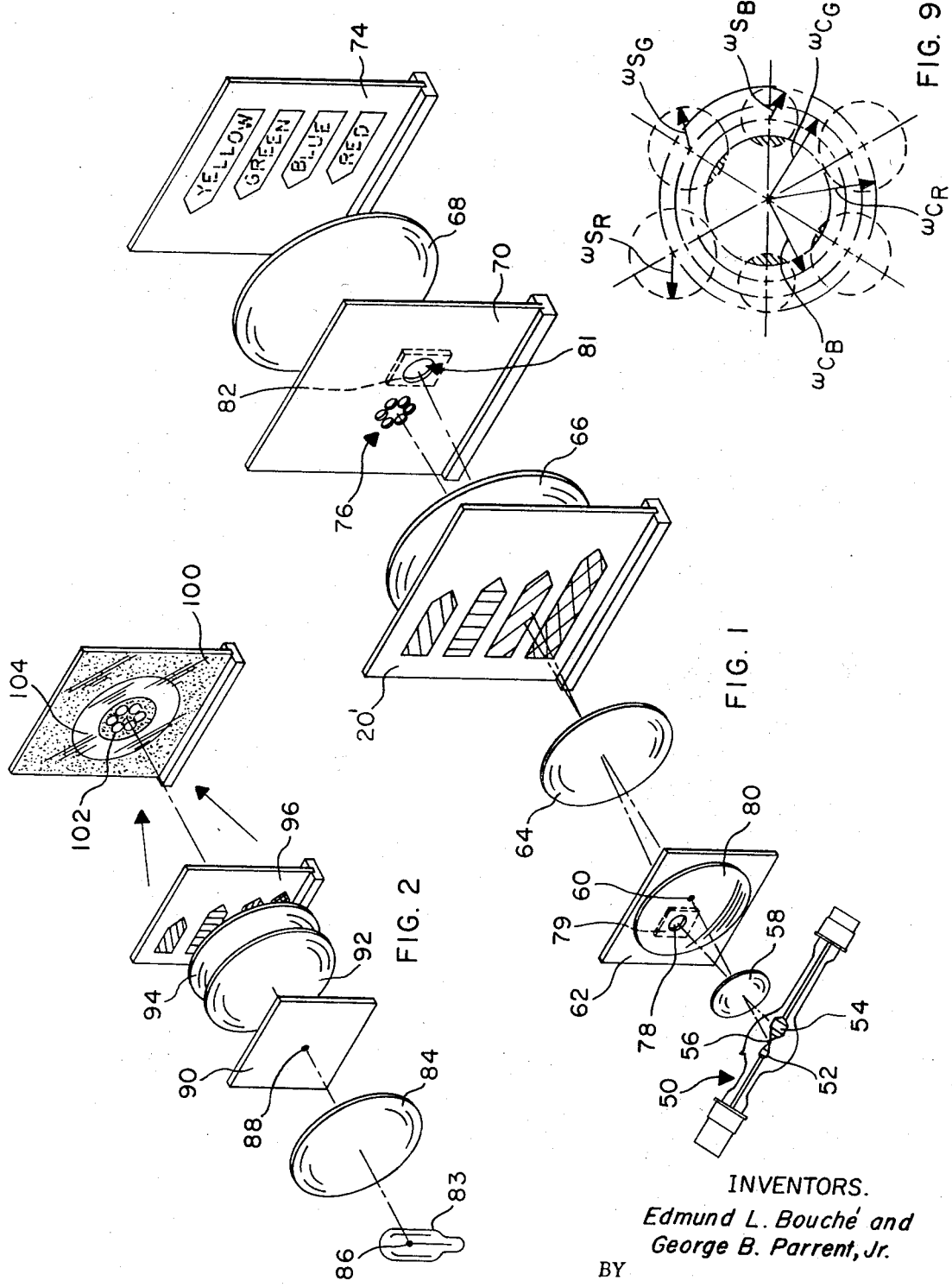

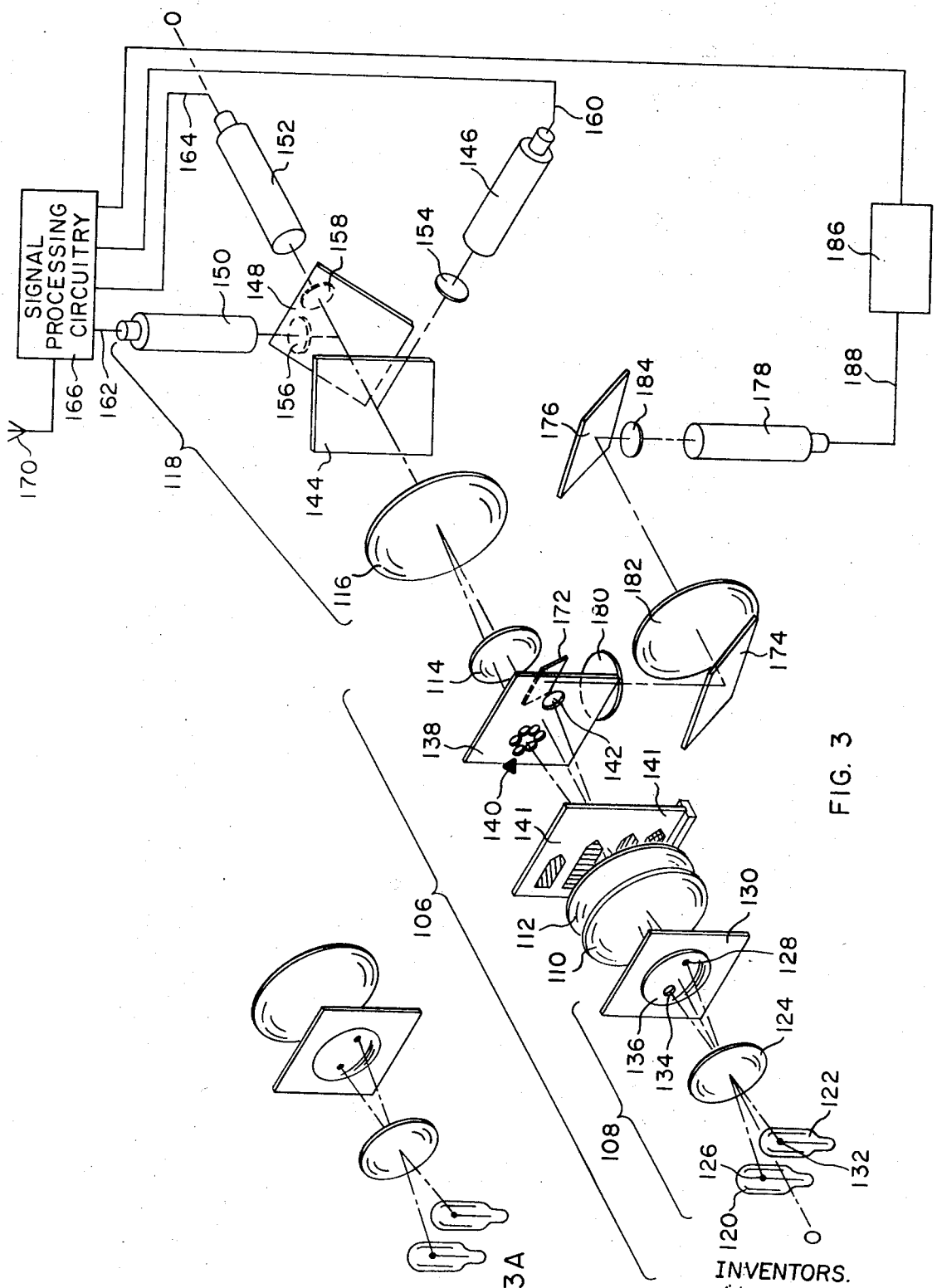

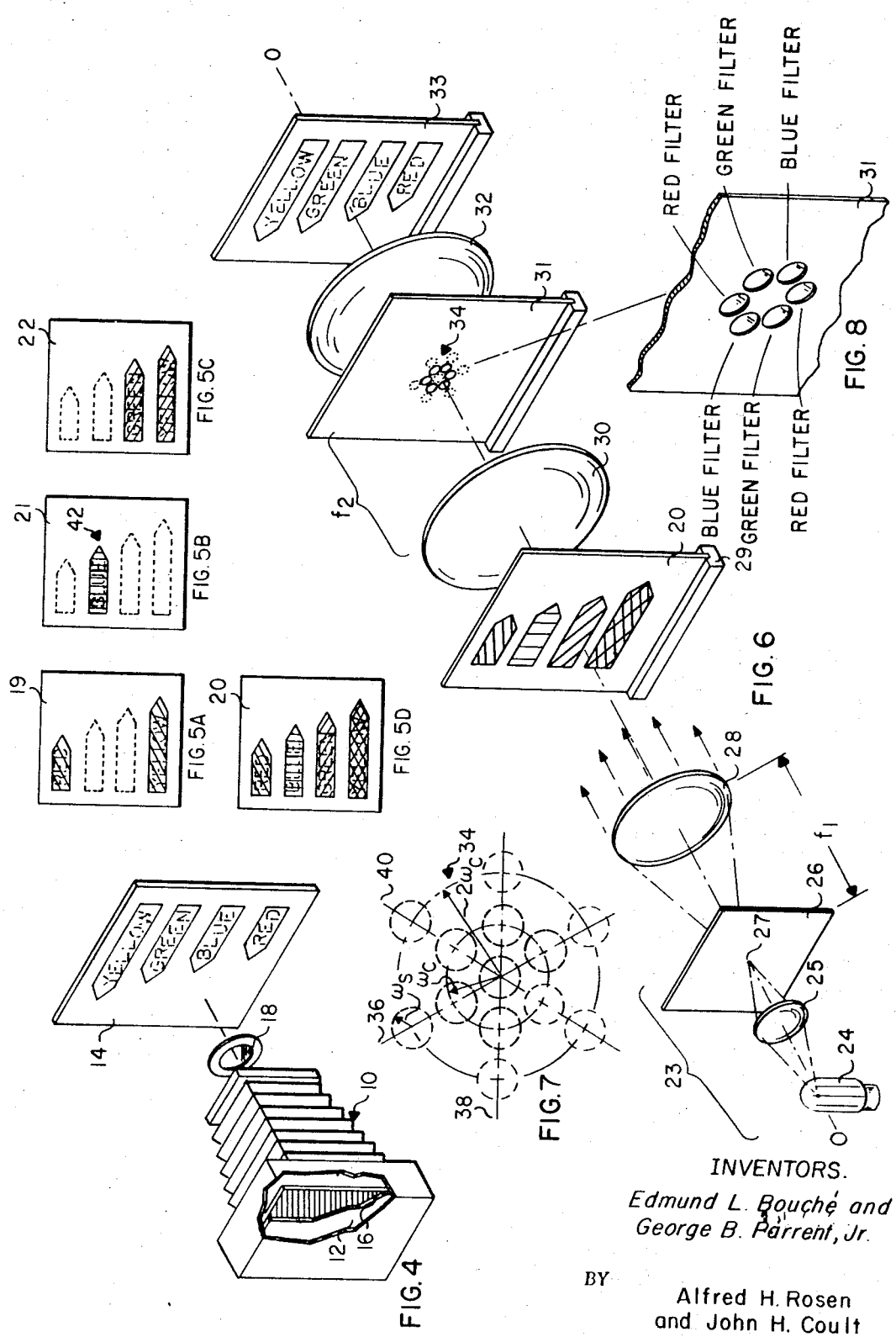

3,549,237
OPTICAL APPARATUS AND METHOD FOR DISPLAYING SPATIALLY PERIODICALLY MODULATED RECORDS
Edmund L. Bouche, Lexington, and George B. Parrent, Jr., Carlisle, Mass., assignors to Technical Operations, Incorporated, Burlington, Mass., a corporation of Delaware
Filed Dec. 18, 1967, Ser. No. 697,267
Int. Cl. G02b 27/18, 27/38
U.S. Cl. 350—162
23 Claims

ABSTRACT OF THE DISCLOSURE

This disclosure depicts apparatus and method for recovering information which is stored on photographic records as modulation of a spatial carrier. More particularly, this disclosure depicts apparatus and method for displaying such photostored information, teaching provision of an auxiliary wideband optical channel.

CROSS-REFERENCES TO RELATED APPLICATIONS

The subject matter described herein and shown in FIG. 3 concerning picking off an optical channel spatially separated from other channels in a Fourier transform space by means disposed in the vicinity of the transform space involves an invention described in copending patent application of Frederick C. Henriques, et al., Ser. No. 691,567, filed Dec. 18, 1967, assigned to the assignee of the present invention.

BACKGROUND OF THE INVENTION

This invention concerns apparatus for displaying records having a plurality of images recorded in self-registering overlapping relationship on the same element of storage material. Each of the images represents a scene record multiplied with a distinct spatially periodic modulation. Or, stated in another way, each of the recorded images (sometimes termed "records" herein) modulates (or is impressed or "rides" on) a unique spatial carrier. The images are selectively recoverable, one or more at a time, by the use of diffraction phenomena and spatial filtering in a Fourier transform space. By the uniqueness of the periodic modulation associated with each of the images, the respective diffraction patterns of the separate images are caused to be separated in the transform space. By appropriate spatial filtering in the transform space, the desired image or images may be displayed. The technigue is extraordinarily adaptable to producing full-color scene reproductions from a colorless photographic record. For example, if a colored scene is photographed in succession through red, green and blue spectral filters, and if while doing so, a spatially periodic modulation, e.g. a grating, is multiplied with each of the images at respectively different azimuthal orientations, three self-registered records will be formed, each being associated with a distinct spectral zone and modulation orientation.

To reconstruct a full-color reproduction of the photographed scene with a record produced as described, the record may be transilluminated with a beam of light having substantial spatial coherence imaged with a projection lens. "Partially" or 'substantially" coherent light is herein intended to mean light which is spatially coherent over at least a few periods of the periodic modulation (spatial carrier) on a projected record, at the location of the record. With the periodic modulations acting as diffraction gratings, a plurality of Fraunhofer diffraction patterns are formed in space. The respective patterns thus formed share a common zeroth order location, but are relatively angularly spaced in accordance with the relative angular orientations of the grating vector during exposure. Each of the order of each of the patterns represents a convolution of a spectrum of scene spatial frequencies with a delta function representing the Fourier transform of one of the sinusoidal Fourier components of the associated periodic modulation. By appropriate spatial filtering of the diffraction orders with an apertured mask in the transform space and by appropriate spectral filtering of the mask apertures to correlate the spectral content of the light passed by each of the mask apertures with the spectral zone associated with the color separation image passed by that aperture, a full-color reconstruction of the original scene may be obtained.

Techniques of spectral zonal photography have been known for some time. For example, in 1936 a technique involving associating distinct periodic modulations with separate color separation records and utilizing spatial filtering for image retrieval was explained in a patent issued in the United States to Bocca, Pat. No. 2,050,117 (later reissued as reissue patent number Re. 20,748). It is significant to note that the concept of spectral zonal photography therein described has not been developed in spite of its early discovery and its considerable potential commercial value. Among the factors which hampered the development of this concept are thought to be the following: (1) the spatial frequency bandwidth limitations imposed by cross-product interference effects ("cross talk") between channels; (2) random noise appearing in the displays as a result of random amplitude and/or phase perturbations of the coherent illuminating wavefronts caused by defects in the recording medium, etc; and (3) the limited brightness of the displayed images.

Each of these supposed limitations is a consequence of the necessity that the projection radiation have at least a predetermined minimum amount of coherence in order to achieve the necessary diffraction effects.

OBJECTS OF THE INVENTION

Accordingly, it is an object of this invention to provide novel display apparatus and method for displaying information stored optically on a spatially periodically modulated record, which apparatus and method is capable of producing displays exhibiting greater resolution than was obtainable previously.

It is another object to show method and means for minimizing random noise effects in displays produced by apparatus, as described, requiring projection radiation having at least partial coherence.

It is yet another object to provide display apparatus and method capable of producing from colorless records color displays of enhanced brightness. It is an important object of this invention to provide novel display apparatus and method for displaying information photostored on a record as multiplication with a spatial frequency carrier, which apparatus and method includes the provision of a first information channel containing a spectrum of record spatial frequencies of a predetermined bandwith carried on a spatial carrier, and including the provision of a second information channel substantially independent of said first channel containing a spectrum of object spatial frequencies having a bandwith greater than that of said first channel, the projected radiation for said second channel having no coherence constraint.

It is still another object to control the temporal spectral content and relative energies transmitted in said first and second channels.

Further objects and advantages of the invention will in part be obvious and will in part become apparent as the following description proceeds.

It is yet another object of this invention to provide light source means capable of establishing a first effectively far field source of radiation which has a substantial spatial coherence and a second effectively far field source of radiation which has less spatial coherence than the radiation produced by the first source.

The features of novelty which characterize the invention will be pointed out with particularity in the claims annexed to and forming a part of this specification.

SUMMARY OF THE INVENTION

This invention concerns in one aspect thereof, method and apparatus for recovering one or more superimposed images stored, respectively, on a record as a multiplication with a unique periodic modulation, including forming in a Fourier transform space a diffraction pattern of the record spatial frequencies and spatially filtering the pattern to pass one or more diffracted orders to provide one or more optical information channels containing, respectively, a spectrum of spatial frequencies convolved with a spatial carrier generated by said periodic modulation. An additional optical information channel, substantially independent of said first channel, is provided which contains a relatively wideband spectrum of record spatial frequencies not convolved with a spatial carrier generated by said modulation. In a preferred embodiment, the diffracted channel or channels carry relatively narrow band color information, and the second information channel is a wideband monochrome channel for enhancing resolution and luminance of the reconstructed images and for improving the signal-to-noise ratio in the image.

BRIEF DESCRIPTION OF THE DRAWINGS

For a fuller understanding of the invention, reference may be had to the following detailed description taken in connection with the accompanying drawings wherein;

FIG. 1 is a distorted-scale schematic perspective view of a preferred form of projection display apparatus embodying the principles of this invention to provide increased resolution and brightness and reduced noise in the displayed images;

FIG. 2 is a distorted-scale schematic perspective view of an alternative embodiment of a portion of projection display apparatus which may be constructed in accordance with the teachings of this invention;

FIG. 3 is a distorted-scale schematic perspective view of an embodiment of the invention adapted to feed the optical input to a television camera chain;

FIG. 3A is a view of a portion of yet another embodiment of the invention wherein the radiation in both the narrowband and wideband channels is rendered partially coherent;

FIG. 4 is a distorted-scale schematic perspective view of a colored object and photographic camera which might be used for forming photographic records of the object; the view shows the camera partially broken away to reveal a photographic recording material and a diffraction grating which would be otherwise hidden within the interior of the camera;

FIGS. 5A–5D show individual and composite color separation records of the object being photographed, each of the individual records being associated with a particular zone of the visible spectrum and with a periodic modulation distinctive by its relative angular orientation;

FIG. 6 is a distorted-scale schematic perspective view of prior art projection display apparatus for displaying photographic records of the above-described type;

FIG. 7 is a front elevation view, schematic and grossly simplified for ease of understanding, of a Fraunhofer diffraction pattern which might be formed in a Fourier transform space in the apparatus of FIG. 6;

FIG. 8 is a schematic perspective view, enlarged and broken away, of a spatial filter shown in FIG. 6; and FIG. 9 is an enlarged view of a portion of a Fraunhofer diffraction pattern, showing more accurately than in FIG. 7, the relative goemetry of the diffraction orders associated with the red, blue and green color separation information.

DESCRIPTION OF THE PREFERRED EMBODIMENTS

As indicated above, the recovery of stored information from photographic records by diffraction phenomena and spatial filtering has been hampered by low resolution and random noise effects in the reconstructed images, and by the low levels of luminous energy which can be delivered through the film gate to the display screen. FIGS. 1–3 depict three of the many possible implementations of the inventive concepts. However, in order to better understand the invention and its significance, a brief discussion of the general nature of the information storage and recovery technique with which this invention is involved, and the nature of the problems which exist in prior art display apparatus will be first engaged.

FIG. 4 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 4 depicts the first step of a multi-step operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example, by reversal processing techniques would appear as shown in FIG. 5A. The object appears inverted, of course, because of the property of the objective lens of rotating the image 180°. It is seen from FIG. 5A that the grating modulation is superimposed upon the object detail associated with light having a red spectral content. Note that because of the red constituent of yellow light, the yellow area in the object 14 is also imaged with superimposed grating lines of like angular orientation.

To complete the deformation of a composite photographic record, as shown in FIG. 5D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 5B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 5D, the object area having yellow spectral content has superimposed thereon spatially periodic modulations associated with both the red and green color separation records.

Apparatus for displaying such a photographic record is known to the prior art and may take the form shown in FIG. 6. Such display apparatus includes a source 23 of at least partially coherent light, illustrated as comprising an arc lamp 24, a condenser lens 25 and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32 and a displayed screen 33 completes the display apparatus.

Upon illumination of a transparency record, such as composite record 20 in film holder 29, as a result of diffraction and interference phenomena and the relative angular displacement between the periodic modulations respectively associated with the color separation records 19, 21, and 22, three angularly displaced multi-order diffraction patterns, collectively designated by reference numeral 34, will be produced, as shown, for example, in the schematic illustration in FIG. 7. Each of the component diffraction patterns associated with a particular color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order $m$.

By the use of transform lens 30 these diffraction patterns are formed within the confines of the projection system in a space commonly known as the Fourier transform space. It is thus termed because of the spatial and temporal frequency analysis which is achieved in this plane by the described diffraction and interference effects. Through the use of spatial and spectral filtering of these patterns in the transform plane, one or more of the discrete color separation images may be displayed. If all three color separation images are retrieved simultaneously and appropriately color filtered, a reconstitution of the original scene in true color is achieved.

The nature of the Fourier transform space and the effects that may be achieved by spatial filtering alone or by spatial and spectral filtering in this space of a selected diffraction order or orders may be understood by reference to FIG. 7. FIG. 7 shows three angularly separated diffraction patterns corresponding to the red, blue and green light object spatial frequency spectra lying along axes labeled 36, 38 and 40 respectively. Each of the axes 36, 38 and 40 is oriented orthogonally to the periodic modulation on the associated color separation record. The diffraction patterns share a common zero order but have spatially separated higher orders.

By the nature of diffraction phenomena, the diffraction angle $\alpha$ is:

$$\alpha = \lambda \omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis:

$$R = f_2 m \omega_c \overline{\lambda}$$

where $f_2$ is the focal length of lens 30; $\overline{\lambda}$ is the mean wavelength of the illuminating radiation; $m$ represents the diffraction order; and $\omega_c$ is the fundamental grating frequency.

It should be understood that the FIG. 7 illustration of the diffraction patterns which might be formed is a gross simplification. In the interest of clarity and ease of understanding, the delimitation of the various diffraction orders has been represented as being circular. In reality, of course, the orders have no finite outline in transform space. The order boundaries indicated are merely isophotic lines connecting points of like energy level. In the real situation, the shape of the isophotic lines is determined by the light source shape, the envelope of the grating elements, and the scene or object recorded.

The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 6. Since the zeroth order components of the diffraction patterns are spatially coextensive, the spatial frequencies contained in the zeroth order information channel represents the sum of the spectra respectively associated with each of the color separation records, 19, 21, and 22. Thus an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green-associated axes 36, 38, and 40, the proper spectral characteristic may be added to each of the information channels by appropriate spectral filtering.

FIG. 8 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wavefronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

It is evident that by prior art methods and apparatus, the display photographic records of the above-described type is hampered by the low levels of image brightness which may be obtained. One reason for the low image luminance concerns the requirement that the effective source must not exceed a predetermined maximum size to prevent overlap, and thus "cross talk," between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theorem.) Since each diffraction order is an image of the illuminated aperture 27 in mask 26 magnified by the ratio $f_2/f_1$, it follows then that the diameter $d$ of the aperture 27 in mask 26, and thus the total light flux transmissible through the aperture 27, is constrained in accordance with the relationship (assuming collimated light at the film gate 29);

$$d = f_1 \bar{\lambda} \omega_c$$

where $f_1$ represents the focal length of lens 28, and $\bar{\lambda}$ and $\omega_c$ are as indicated above.

The illuminance of the film gate by the collimator is $$E = \frac{Bd^2}{4f_1^2}\pi$$

where B is the source photometric brightness (luminance) in candles/cm.² Substituting for $d$ from above $$E = \frac{\pi B \bar{\lambda}^2 \omega_c^2}{4}$$

This relation clearly illustrates that an increase in the brightness of displayed images can be obtained by previous techniques only at the cost of increasing the source brightness B or the grating frequency $\omega_c$.

Further, in addition to the low-brightness levels attainable, the images capable of being displaced by prior art techniques have had comparatively poor resolution. By the sampling theorem, the maximum bandwidth of resolvable spatial frequencies in the direction of the modulation vector, along which the detailed information in the scene is sampled, is equal to one-half of the spatial frequency of the sampling modulation. However, in the actual practice of prior art display techniques the bandwidth of record spatial frequencies which can be resolved is substantially less than one-half the modulation frequency. The reason for this becomes apparent upon examination of the nature of the diffraction patterns of the record spatial frequencies which are formed in transform space.

As suggested, the schematic representation in FIG. 7 of the diffraction pattern of the record spatial frequencies formed in transform space is vastly simplified. FIG. 9 more accurately represents the diffraction pattern which would be formed. It will be understood that because of the dependence of the diffraction angle on both spatial frequency and the wavelength of the illuminating radiation, the radial displacement in transform space from the pattern axis of carrier frequencies is different for each illuminating wavelength. Thus, the spectrum of spatial frequencies in the record diffracted by the long wavelength illuminating radiation will be centered about a spatial carrier spaced farther from the diffraction pattern axis than the record spatial frequency spectrum carried on a spatial carrier produced by shorter wavelength radiation.

Also, as shown in FIG. 9, again because of the dependence of the diffraction angle on the wavelength of the illuminating radiation, the diameter of the diffraction orders for a given value of $\omega_s$ is dependent on the wavelength of the illuminating radiation.

It has been found that the bandwidth of record spatial frequencies available for retrieval actually is substantially greater than would be dictated by the sampling theorem; namely, a bandwidth of frequencies exceeding one-half of the spatial frequency of the sampling modulation.

It is seen from a study of FIG. 9, however, that the bandwidth of spatial frequencies which may be detected by prior art spatial filtering techniques is appreciably less than one-half the sampling modulation frequency. There are a number of reasons for this. First, structural limitations are imposed on the spatial filter if the filter is to be formed, for example, by a photo-etching process; a supporting web must be left between the openings passing the selected diffraction orders. An interstitial area between the orders is also necessary to allow for the spherical and longitudinal chromatic aberrations produced by the transform lens (lens 30 in the FIG. 6 system). Thus, the maximum bandwith of spatial frequencies which may be detected by previous techniques without introducing crosstalk is considerably less than one-half the spatial frequency of the sampling modulation impressed upon the record.

The prior art display apparatus and techniques have yet another drawback. Due to the requirement that the illuminating radiation be at least partially coherent in order to achieve the diffraction effects necessary to separate the superimposed images on the record, a random noise, appearing as a speckling effect, will be created in the displayed images. This speckling effect is a result of random amplitude and phase perturbations of the illuminating wavefronts due, inter alia, to random defects in the recording medium.

This invention is directed toward the alleviation of each of the above-described factors causing degradation of the reconstructed images—namely low brightness, relatively poor resolution, and random noise. Display or image reconstruction apparatus constructed in accordance with this invention includes one or more optical information channels which contain a spectrum of the record spatial frequencies carried upon a spatial carrier generated by a periodic modulation on the record. By this invention, there is provided an additional optical information channel which may, or may not be, created and sustained by the same light source which establishes the afore-described information channels, which information channel is segregated from the afore-described channels and transmits zeroth order spectra. This additional channel is thus freed from the inherent bandwidth constraints imposed upon information channels transmitting spectra of the record spatial frequencies impressed upon a spatial carrier. By this expedient, a greater bandwidth, and thus a greater resolution in the displayed images is achieved. In addition, the added luminous energy transmitted through the wideband channel adds in intensity to the image constructed from the combined narrowband channels to produce brighter displays.

In a preferred embodiment, the wideband channel is established by an essentially independent low coherence light source in order that the random noise pattern in the displayed images may be decreased or entirely overcome.

FIG. 1 illustrates schematically one of many possible implementations of the inventive concepts. In the interest of clarity of description of the invention, the display apparatus illustrated in FIG. 1 is shown to be generally similar to that shown in FIG. 6 described above, but modified in accordance with the teachings of the invention.

Referring now to FIG. 1, display apparatus constructed in accordance with the invention may have a projection lamp 50 including electrodes 52 and 54 for creating an arc 56 providing an intense luminous radiation source of limited size and broad (temporal) spectral bandwidth. As in the FIG. 6 apparatus, a condensing lens 58 forms an image of the arc 56 upon a small aperture 60 in a mask 62. A collimating lens 64, transform lens 66, and projection lens 68, have similar functions in the FIG. 1 system as did the lenses 28, 30, and 32 in the system illustrated in FIG. 6. A transform spatial filter 70 is located in a Fourier transform space established within the display apparatus.

Transform lens 66 and projection lens 68 cooperate to image a density-modulated photographic record 20' (which, for simplicity of explanation, is shown as being similar to the photographic record 20 in FIG. 6) upon a display screen 74. The collimating lens 64 may be located a distance from the mask 62 which is equal to the focal length of the lens 64. Substantially collimated radiation from the collimating lens 64 is diffracted upon transmission through the record 20' to form a plural number (depending on the number of sampling modulations of unique azimuthal orientation on the record-three in the illustrated embodiments) of angularly displaced diffraction patterns sharing a common zeroth order location, as described above with respect to the FIG. 6 apparatus.

The transform spatial filter 70 is provided with a group of openings 76 comprising three symmetrical pairs of component openings for transmitting through Fourier transform space first order components of the diffraction patterns respectively associated with the red, blue, and green color separation records which are stored in superimposed relationship upon the record 20'. By appropriate spectral filtering of the openings 76 in the spatial filter 70, a full color reproduction of the original scene may be achieved on the display screen 74.

By this invention, at least one additional optical information channel is provided for improving the resolution and brightness and decreasing the noise in the reconstructed images. The additional information channel, hereinafter termed the wideband channel, is preferably generated by a source producing spatially less coherent or incoherent radiation in order that the image signal be intensified relative to the "speckle" noise in the reconstructed image.

To produce a second, substantially incoherent source, a second aperture 78 of substantially greater dimension than the aperture 60 is provided in the mask 62 at the location of the image formed by condensing lens 58 of the electrode 54, which in its energized state will be incandescent. Because of the difference in color temperature of the arc 52 and the electrode 54 when incandescent, a color balancing filter 79 such as is designated 2–CC 10–B may be placed over the aperture 78. A field lens 80 is preferably located substantially at the plane of the apertures 60 and 78 to minimize light losses.

By the fact of the angular separation of the apertures 60 and 78 in mask 62, the image of the aperture 78 formed in transform space on the transform spatial filter 70 by the collimating lens 64 and transform lens 66 will be displaced sufficiently far from the diffraction pattern formed on the openings 76 in filter 70 so as to preclude interference therebetween. In order that a wide bandwidth of spatial frequencies associated with structural detail in the record may be passed through transform space for retransformation by projection lens 68, the spatial filter 70 is provided with a spatial filter aperture 81, whose maximum dimension is substantially greater than the maximum dimension of any of the spatial filter openings 76 provided to detect the diffracted object spectra associated with the respective narrowband color channels. The above-described invention has been successfully practiced employing a spatial filter 70 having openings 76 in the order of $.8\omega_s$ millimeters maximum dimension, and a wideband filter aperture 81 having a maximum dimension in the order of $2\omega_s$ millimeters.

The provision of the additional wideband information channel has the further advantage of enhancing the brightness of the reconstructed images, however, at a sacrifice in color resolution. It has been found that the reconstructed images are improved by the addition of the wideband channel information with some color saturation being traded off in favor of increased image resolution and decreased coherence noise effects. A neutral density filter such as is shown at 82 in FIG. 1 is preferably provided for regulating the relative intensity of the radiation in the narrowband channels as compared with that in the wideband channel.

FIG. 2 shows an alternative embodiment of the invention which requires only a single source of substantially coherent radiation. As in the FIG. 1 embodiment, the FIG. 2 embodiment (shown only in part for clarity of illustration of the invention) includes an arc lamp 83 and a condensing lens 84 for focusing an image of the arc 86 generated by the arc lamp 83 on an aperture 88 of restricted size in a mask 90. A collimating lens 92 and a transform lens 94 are provided. It has been found that the radiation beam illuminating the record need not be collimated or that the light source even be effectively in the far field. The FIG. 2 arrangement illustrates this fact. With the transform lens 94 located in front of the record, as shown, the light beam has substantial convergence as it traverses the record. Partially coherent light emanating from the transform lens 94 is transmitted through a record 96 to form a diffraction pattern upon a spatial filter 100 located in a transform space established within the optical system. The spatial filter 100, which may be formed, for example, by photographic techniques, has a plurality of angularly spaced spatial filter openings 102 for passing first order components of the diffraction patterns associated with red, blue, and green color separation images, all as described above.

In accordance with this invention, a second optical channel is provided in the form of a substantially annular light-transmissive area 104 surrounding the diffraction pattern 98. A spectrum of record spatial frequencies modulating the grain in the record medium (which acts as a carrier) will be passed to enhance the resolution and brightness of the reconstructed image. The FIG. 2 embodiment, of course, will not provide improvements in the random noise effects produced in the reconstructed images as a result of the coherence of the illuminating radiation.

Still another embodiment of the invention is shown in FIG. 3. This embodiment is adapted to provide an optical input into a video camera chain of the parallel luminance (sometimes termed YRGB) type. The FIG. 3 embodiment is depicted as comprising apparatus for reconstructing an image of the original scene at the field lens input to the video camera chain. The optical image reconstructor, designated generically by reference numeral 106, comprises light source means 108, a collimating lens 110, a transform lens 112, and a projection lens 114 for retransforming the record information to reconstruct a full-color reproduction of the original scene at a field lens 116 at the input to a video camera chain, designated generically by the reference number 118.

The above-identified components of the optical image reconstructor 106 are generally similar to the corresponding components in the FIGS. 1 and 2 embodiments described above. The FIG. 3 embodiment, however, illustrates an alternative means for forming a first source of coherent radiation for a plural number of narrowband information channels and a second source of less coherent radiation for a wideband information channel. The modified light source means 108 comprises first and second projection lamps 120 and 122 spaced on opposed sides of the optical axis 0—0. A condensing lens 124 forms an image of the arc 126 formed by lamp 120 upon an aperture 128 of restricted size in a mask 130. The condensing lens 124 also images the arc 132 formed between the electrodes of projection lens 122 upon a second, larger aperture 134 in mask 130. The minimum dimension of the aperture 134 is sufficiently large as to exceed the maximum dimension necessary for the production of spatially coherent radiation, as defined above. Thus, the aperture 134 may be regarded as a source of incoherent radiation.

A field lens 136 is provided for imaging the effective aperture of the condensing lens 124 into the aperture of the collimating lens 110 in order to maximize the amount of luminous energy transmitted through the system.

A spatial filter 138 located in a Fourier transform space contains three diametrically opposed constituent pairs of openings, labeled generically 140, for passing first order diffraction spectra associated with the red, blue, and green color separation records, and thus providing three narrowband channels for transmitting red, blue, and green color information, respectively, stored on a record 141.

As in the FIGS. 1 and 2 embodiments, the spatial filter 138 includes a spatial filter opening 142 of substantially greater dimension than that of any of the openings 140 in order that the information channel associated with the source of less coherent radiation may carry a wideband of record spatial frequencies.

The video camera chain 118 is illustrated very schematically as comprising at a primary input thereto a field lens 116 at which the image reconstructor 106 erects a full-color image of the original scene; a first dichroic mirror 144 for selectively reflecting long wavelength radiating to a red record vidicon 146; a second dichroic mirror 148 for selectively reflecting short wavelength radiation to a blue record vidicon 150; and a green record vidicon disposed on the optical axis 0—0 for receiving information associated with middle wavelength radiation. The green record image may be reversed electronically by conventional scan reversing techniques to bring its posture into correspondence with the blue and red record images on the vidicons 150 and 146. The red, blue, and green record vidicons 146, 150, and 152 have associated therewith objective lenses 154, 156, and 158 for imaging, respectively, the field lens 116 onto the respective vidicon screens. Leads 160, 162, and 164 from the red, blue, and green vidicons feed signal processing circuitry 166, shown in black box form for simplicity of illustration. The signal processing circuitry 166 performs the functions of amplification, matrixing, and other conventional electronic operations to develop a composite signal for transmission from antenna 170.

In accordance with this invention there is provided an independent optical information channel carrying a wideband of spatial frequencies available for separate processing in the camera chain from the channels associated with the color information. To this end, there may be provided an array of mirrors 172, 174, and 176 for tapping the wideband information channel from the optical system at a point immediately behind the spatial filter 138 and for transmitting this radiation to a high resolution vidicon 178 for picking up the high (spatial) frequency information in the record 141. A projection lens 180, a field lens 182, and an objective lens 184, corresponding in function to the projection lens 114, field lens 116, and objective lenses 154, 156, and 158, may be provided for forming on the screen of the high resolution vidicon 178 an image of the record which is identical in magnification and registration with the record images formed on the vidicons detecting the red, blue, and green color information.

In order that the luminance information carried separately in the wideband channel may be processed separately, additional signal processing circuitry 186 is provided in a lead 188 from the high resolution vidicon 178 to the signal processing circuitry 166. With an arrangement as described wherein the color and luminance information may be processed separately, the luminance signals may be amplified to any desired degree independent of signals carrying the color information. This capability is not available in conventional video camera chains for the reason that a single reconstruction of the record information at a field lens corresponding to the field lens 116 in FIG. 3 offers no means of detecting and manipulating the luminance information independently of the color information. In conventional parallel luminance video camera chains the luminance information is picked off the optical axis by a beam splitter, with the color vidicons being supplied from dichroic mirrors as illustrated.

It is evident then that with conventional systems, a trade-off must be made in the information of the image at the field lens 116 between resolution and color saturation. By the present invention, this trade-off is obviated; the luminance information containing a wideband of spatial frequencies can be amplified independently of the color signals and then recombined with the color information in the matrixing circuits in the signal processing circuitry 166 to achieve any desired degree of resolution and color saturation.

With a separate wideband luminous channel provided as taught by this invention, the luminance information may be independently manipulated in phase, bandwidth, or in any other parameter or characteristic without affecting the color information.

As in the FIG. 1 embodiment, by the provision of incoherent radiation in the wideband channel, the high resolution vidicon 178 picking up the high frequency detail in the record will not be deteriorated by the presence of random noise.

The invention is not limited to the particular details of construction of the embodiments depicted, and its is contemplated that various and other modifications will occur to those skilled in the art. For example, if desired, the additional wideband channel may be rendered coherent in a multiple source embodiment. Such a modification of the FIG. 3 embodiment could easily be accomplished by making both apertures in mask 130 small enough to satisfy the above-discussed requirement for coherence, as shown in FIG. 3A. The elements of the system fragment shown in FIG. 3A have the same function as the corresponding elements in the FIG. 3 system. With this modification, both of the effectively far field sources created produce radiation which is partially coherent at the film gate. Further, a laser, rather than a point source and collimator, may be used to provide radiation of the necessary coherence for the establishment of the described diffraction patterns. Certain other changes may be made in the above-described apparatus without departing from the true spirit and scope of the invention herein involved, and it is therefore intended that the subject matter of the above depiction may be interpreted as illustrative and not in a limiting sense.

What is claimed is:

1. For use with optical apparatus for projecting a record on which stored information modulates a spatial carrier, the apparatus having means providing at least one beam of light with substantial spatial coherence at the record and lens means for focusing said beam to form a diffraction pattern of the record, the improvement comprising spatial filter means for location at the back focus of said lens means defining a first opening located to pass at least a portion of a diffracted order of said diffraction pattern to provide a first information channel containing a first spatial frequency spectrum of the record, said spatial filter means defining an annular second opening of greater size than said first opening and being located concentrically with and surrounding said diffraction pattern to pass scattered light and for providing a second information channel containing a second spatial frequency spectrum of said record of greater spatial frequency bandwidth than said first spectrum.

2. In optical apparatus having an optical axis for projecting a record on which stored information modulates a spatial carrier, the combination comprising:
   film gate means for supporting a record on said axis;
   light source means for establishing first and second separated light sources, at least said first source producing radiation which has substantial coherence at said film gate means;
   lens means for forming first and second images of said first and second sources, respectively, said first image comprising a multi-order diffraction pattern of the record spatial frequencies; and
   spatial filter means located at the back focus of said lens means defining a first opening located to pass at least a portion of a diffracted order of said diffraction pattern containing a first spatial frequency spectrum of said record, said spatial filter means defining at the location of said second source image a second opening of greater size than said first opening for passing a second spatial frequency spectrum of said record of greater bandwidth than said first spectrum.

3. The apparatus defined by claim 2 wherein each of said first and second light sources produces radiation which has substantial spatial coherence at said film gate means such that both of said source images formed in said transform space comprise multi-order diffraction patterns of the record spatial frequencies, and wherein said

13 second opening is located to pass at least a portion of the zeroth order of the diffraction pattern associated with said second source.

4. The apparatus defined by claim 2 wherein said second source produces radiation which is substantially incoherent at said film gate means.

5. The apparatus defined by claim 4 wherein said light source means comprises separately energizable means for establishing said first and second light sources.

6. The apparatus defined by claim 4 wherein said light source means comprises an arc lamp having a pair of electrodes for forming an arc therebetween when energized, light blocking means defining first and second apertures, condensing means for forming an image of said arc on said first aperture and an image of one of said electrodes on said second aperture, and collimating lens means disposed a distance $s$ from said light blocking means substantially equal to the effective focal length of said collimating lens means, said first aperture having a diameter no greater than $d$ and said second aperture having a diameter no less than $d$ where $$d = s\bar{\lambda}\omega_c$$

$\bar{\lambda}$ representing the mean wavelength of the radiation illuminating said first and second apertures and $\omega_c$ representing the spatial frequency of said periodic modulation.

7. The apparatus defined by claim 4 including color filter means having a predetermined spectral transmittance characteristic disposed in registration with said first opening for associating the information in said first chanenl with a predetermined zone of the visible spectrum.

8. The apparatus defined by clami 7 including neutral density filter means registered with said second opening for regulating the relative intensities of radiation in said first and second information channels.

9. In optical apparatus having an optical axis for projecting a record on which is stored a plural number of color separation images respectively modulating spatial carriers having a predetermined azimuthal separation, the combination comprising:
    film gate means for supporting a record on said axis;
    light source means for establishing first and second separated light sources, said first source producing radiation which has substantial spatial coherence at said film gate means, said second source producing radiation which is less coherent at said film gate means than the radiation produced by said first source;
    lens means for forming images of said first and second sources, said image of said first source comprising a diffraction pattern containing a mated pair of first orders for each color separation image, the pairs lying along axes respectively orthogonally related to the orientation of the associated image carrier; and
    spatial filter means located at the back focus of said lens means defining openings located to pass at least a portion of at least one diffracted first orders of each of said pairs of orders to form a plural number of information channels respectively carrying a spectrum of spatial frequencies associated with a different one of said color separation images, said spatial filter means also defining a light transmissvie area located to pass said image of said second source and being of greater size than the size of any of said openings for passing a wideband spectrum of spatial frequencies representing a sum of the spectra transmitted by said diffracted channels.

10. In the optical projection of an image from a record on which stored information modulates a spatial carrier, the method comprising:
    illuminating the record with a plurality of angularly separated light beams, at least one of which has substantial spatial coherent at the record;
    forming in a Fourier transform space a corresponding plurality of diffraction patterns of the record spatial frequencies;
    selectively passing through said transform space at least a portion of one diffracted order of said diffraction pattern produced by said beam having substantial spatial coherence; and
    selectively passing through said transform space at least a portion of the zeroth order of a second one of said diffraction patterns, the spectrum of spatial frequencies transmitted having greater bandwidth than the transmitted spectrum of said diffracted order.

11. In the optical projection of an image from a record on which stored information modulates a spatial carrier, the method comprising:
    illuminating the record with a first light beam having substantial spatial coherence at the record;
    forming with said first beam in a Fourier transform space a multi-order diffraction pattern of the record spatial frequencies;
    illuminating the record with a second light beam which is substantially incoherent at the record;
    converging said second beam to form in said Fourier transform space a zeroth order diffraction pattern of the record spatial frequencies;
    selectively passing through said transform space at least a portion of a diffracted order of said multi-order diffraction pattern to provide a first information channel containing a first spatial frequency spectrum of said record of predetermined bandwidth;
    selectively passing through said transform space at least a portion of said zeroth order diffraction pattern associated with said source of incoherent light to provide a second information channel containing a second spatial frequency spectrum of said record; and
    combining the information transmitted in said first and second channels to reconstruct an image of the scene.

12. The method of claim 11 wherein said second spectrum of spatial frequencies is caused to have a bandwidth greater than the said predetermined bandwidth of the frequencies in said first spectrum.

13. The method defined by claim 12 including spectrally filtering the light in said first information channel such that said first channel information is associated with a predetermined zone of the visible spectrum.

14. The method defined by claim 13 including attenuating the light in said second information channel to regulate the relative intensities of radiation in said first and second information channels.

15. In the optical projection of an image from a record on which stored information modulates a spatial carrier, the method comprising:
    illuminating the record with a first light beam having substantial spatial coherence at the record;
    forming with said first beam in a Fourier transform space a multi-order diffraction pattern of the record spatial frequencies;
    illuminating the record with a second light beam having less spatial coherence at the record than said first beam;
    converging said second beam to form in said Fourier transform space a zeroth order diffraction pattern of the record spatial frequencies;
    selectively passing through said transform space at least a portion of a diffracted order of said multi-order diffraction pattern to provide a first information channel containing a first spatial frequency spectrum of said record of predetermined bandwidth;
    selectively passing through said transform space at least a portion of said zeroth order diffraction pattern produced with said second light beam to provide a second information channel containing a second spatial frequency spectrum of said record; and
    processing said first and second spectra separately to cause a predetermined differentiation in a characteristic common to both spectra.

16. The method of claim 15 wherein said separate processing of said first and second channels comprises adjusting the relative intensity of the energy in said first and second spectra.

17. The method of claim 15 wherein said separate processing of said first and second channels comprises adjusting the relative spatial frequency bandwidths of said first and second spectra such that the bandwidth of the information in said second spectrum is greater than that in said first spectrum.

18. The method of claim 15 wherein said separate processing of said first and second spectra comprises adjusting the relative temporal frequency spectral content of said first and second spectra.

19. For use in optical display apparatus light source means for producing a first effectively far field light source of a predetermined size for establishing a first optical information channel along a first axis, said first channel having a predetermined bandwidth governed by the size of said first source, and second means for producing a second effectively far field light source of greater size than said first source for establishing a second optical information channel along a second axis of greater bandwidth than said first channel, said first and second effective sources being separated in the far field to cause said first and second axes associated with said first and second information channels to be angularly displaced.

20. The apparatus defined by claim 19 wherein said light source means comprises separately energizable first and second means for establishing said first and second sources, respectively.

21. The apparatus defined by claim 19 wherein said light source means comprises an arc lamp having a pair of electrodes for forming an arc therebetween when energized, light blocking means defining first and second apertures, condensing means for forming an image of said arc on said first aperture and an image of one of said electrodes on said second aperture, and collimating lens means disposed a distance from said mask substantially equal to the effective focal length of said collimating lens means.

22. A method of optically reconstructing an image from a photostorage record on which the image modulates a spatial carrier, comprising:
optically Fourier transforming the record to form in a Fourier transform space a zeroth order characterizing the luminance distribution of the record and a diffracted order particularly characterizing said image;
selectively passing through an opening of a first size in said transform space at least a portion of said diffracted order to establish a first optical information channel having a first spatial frequency bandwidth;
selectively passing through a second opening in said transform space of greater size than said first opening at least a portion of said zeroth order to establish a second optical information channel having a greater spatial frequency bandwidth than said first channel; and
optically combining the information transmitted in said first and second channels to reconstruct said image.

23. A method of optically reconstructing a colored aerial image from a photostorage record on which a plurality of color separation images respectively modulate unique spatial carriers, comprising:
optically Fourier transforming the record to form in a Fourier transform space a zeroth order characterizing the luminance distribution of the record and a plurality of diffracted orders, each of said diffracted orders particularly characterizing a unique one of said color separation images;
selectively passing through discrete openings in said transform space at least a portion of each of said diffracted orders to establish a plurality of optical color channels each having a predetermined spatial frequency bandwidth;
selectively passing through another distinct opening in said transform space of greater side than any of said openings passing said diffracted orders at least a portion of said zeroth order to establish an optical luminous information channel having a greater spatial frequency bandwidth than any of said color channels;
spectrally filtering the light in each of said color channels to cause it to correspond substantially in color to the color information carried thereby; and
optically combining the information transmitted in said color and luminous channels to construct a colored aerial image in which the detail information therein is primarily supplied through the wideband luminous information channel, and in which lower resolution color information is supplied through the narrower bandwidth color channels.

References Cited

UNITED STATES PATENTS

| | | | |
|---|---|---|---|
| 2,050,417 | 8/1936 | Bocca | 350—162SFUX |
| 2,129,195 | 9/1938 | Bocca et al. | 350—162X |
| 2,995,067 | 8/1961 | Glenn | 350—162SFUX |
| 3,108,383 | 10/1963 | Gabor | 350—162X |
| 3,314,052 | 4/1967 | Lohmann | 350—162X |
| 3,370,268 | 2/1968 | Dobrin et al. | 350—162SFUX |

JOHN K. CORBIN, Primary Examiner

U.S. Cl. X.R.

178—5.4; 353—31, 97